United States Patent [19]
Nakagawa

[11] Patent Number: 5,575,056
[45] Date of Patent: Nov. 19, 1996

[54] METHOD OF AND MOLD FOR MOLDING PRODUCT HAVING INSERT

[75] Inventor: Yuji Nakagawa, Tsu, Japan

[73] Assignee: Sumitomo Bakelite Company Limited, Tokyo, Japan

[21] Appl. No.: 389,230

[22] Filed: Feb. 15, 1995

[30] Foreign Application Priority Data

Feb. 25, 1994 [JP] Japan .................. 6-027788

[51] Int. Cl.⁶ .............. B23P 19/04; B29C 39/36
[52] U.S. Cl. .................. 29/527.4; 29/DIG. 29; 29/460; 164/112; 164/332; 425/127
[58] Field of Search ................ 29/460, 527.4, 29/DIG. 29; 164/112, 332; 249/88, 91, 95; 264/277, 278, 279, 279.1; 425/121, 127

[56] References Cited

U.S. PATENT DOCUMENTS

| | | | |
|---|---|---|---|
| 2,628,416 | 2/1953 | Sampson | 29/DIG. 29 X |
| 3,128,728 | 4/1964 | Houston | 164/332 X |
| 3,517,729 | 6/1970 | Wonus | 164/332 X |
| 3,933,334 | 1/1976 | Edwards | 164/112 X |
| 4,230,659 | 10/1980 | Sutch | 29/527.4 X |
| 4,451,974 | 6/1984 | Gellert | 164/112 X |
| 4,738,298 | 4/1988 | Taruno et al. | 164/112 X |
| 4,844,143 | 7/1989 | Herbin et al. | 164/332 |
| 5,073,326 | 12/1991 | Craves et al. | 425/127 X |

FOREIGN PATENT DOCUMENTS 223262  8/1968  U.S.S.R. .................. 164/112

*Primary Examiner*—Peter Vo
*Attorney, Agent, or Firm*—Browdy and Neimark

[57] ABSTRACT

There is disclosed a mold for molding a box-shaped product having metal inserts each having a body and leg portions projecting from the product. The mold includes a pair of mold halves, and a core for placing the inserts thereon in such a manner that the body of the insert slightly spaced from the core, and that the body of the insert is disposed generally flush with or slightly spaced from a surface of one of the mold halves in which a cavity is formed. Slide cores, received respectively in grooves in the one mold half, for movement therealong in directions perpendicular to a direction of opening of the two mold halves, and each of the slide cores has a cavity portion which is to be aligned with the cavity in the one mold half.

2 Claims, 4 Drawing Sheets

METHOD OF AND MOLD FOR MOLDING PRODUCT HAVING INSERT

FIELD OF THE INVENTION AND RELATED ART STATEMENT

This invention relates to a method of and a mold for molding a product having an insert.

In general, the following methods are used for molding a product having an insert with leg portions extending from an inside of the product in parallel to a side or peripheral wall of the product:

(1) An insert is seated on a recess preformed in a mold, which corresponds to the shape of the insert, and then the molding is effected ordinary. In this case, if the insert has only one leg portion, the insert can be easily seated on the recess. However, where the insert has a plurality of leg portions, the insert can not be easily seated on the recess.

(2) A product is molded using an insert without leg portion, and then leg portions are welded to the insert. The portions of the insert to which the leg portions are to be welded are exposed in advance. In this case, much time and labor are required for the welding, and therefore the cost is increased.

(3) An opening is formed in a side wall of a product so as to allow a sliding movement of a slide core, and with this arrangement an insert can be easily seated on the position. In this case, the shape of the product is limited, and therefore the use of the product is also limited.

OBJECT AND SUMMARY OF THE INVENTION

It is an object of this invention to provide a molding method by which a product having an insert structure with a plurality of leg portions can be molded easily and simply at low costs regardless of the shape of the product.

Another object of the invention is to provide a mold for molding such a product.

To this end, according to one aspect of the present invention, there is provided a method of molding a product including an integral portion of a resin having a flat plate-like portion and a peripheral wall portion extending perpendicularly from a peripheral edge of the flat plate-like portion, the product further having at least one insert of metal having a body extending generally parallel to the flat plate-like portion, and a leg portion projecting from the flat plate-like portion substantially parallel to the peripheral wall portion, the method comprising the steps:

setting the insert on one of a pair of mold halves, which has a partial cavity in a surface such that the body of the insert is generally flush with or slightly spaced from, i.e. adjacents the surface of the one mold half, with the body of the insert slightly spaced from, i.e. adjacents a core which cooperates with the lower mold;

slidingly moving slide core in a groove formed in a portion of the one mold half, which corresponds to the leg portion of the insert, the slide core having a cavity portion corresponding to the partial cavity in the one mold half, and pressing the leg portion towards the core;

clamping the other mold half to the one mold half and the slide core to define a whole cavity therebetween;

introducing a resin into the whole cavity;

curing or setting the resin; and opening a mold constituted by the pair of mold halves and the slide cores, and removing the molded product therefrom.

According to another aspect of the invention, there is provided a mold for molding a product including an integral portion of a resin having a flat plate-like portion and a peripheral wall portion extending perpendicularly from a peripheral edge of the flat plate-like portion, the product further having at least one insert of metal having a body extending generally parallel to the flat plate-like portion, and a leg portion projecting from the flat plate-like portion substantially parallel to the peripheral wall portion, the mold comprising:

a pair of mold halves one of which has a partial cavity formed in a surface thereof and at least one groove formed respectively in a portion thereof corresponding to the leg portion of the insert, the pair of mold halves cooperating with each other to define a cavity;

a core for cooperating with the pair of mold halves and for placing the insert thereon in such a manner that the body of the insert is slightly spaced from, i.e. adjacent to the core, and that the body of the insert is disposed generally flush with or slightly spaced from, i.e. adjacent to the surface of the one mold half;

at least one slide core received in the groove in the one mold half for sliding movement therealong in directions perpendicular to a direction of opening of the pair of mold halves, the slide core having a cavity portion to be aligned with the partial cavity in the one mold half;

a gate for communicating with the cavity, through which a resin is introduced into the cavity; and an ejection pin for removing the product from the mold.

DETAILED DESCRIPTION OF THE PREFERRED EMBODIMENTS

Figure 1:
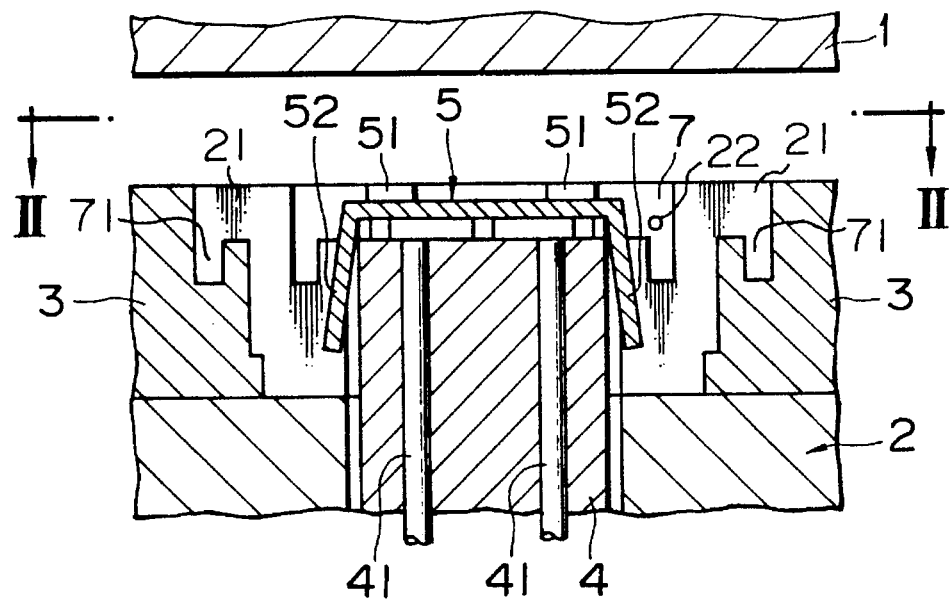
FIG. 1 is a cross sectional view of a mold of an embodiment of the invention, with inserts set therein.
Figure 2:
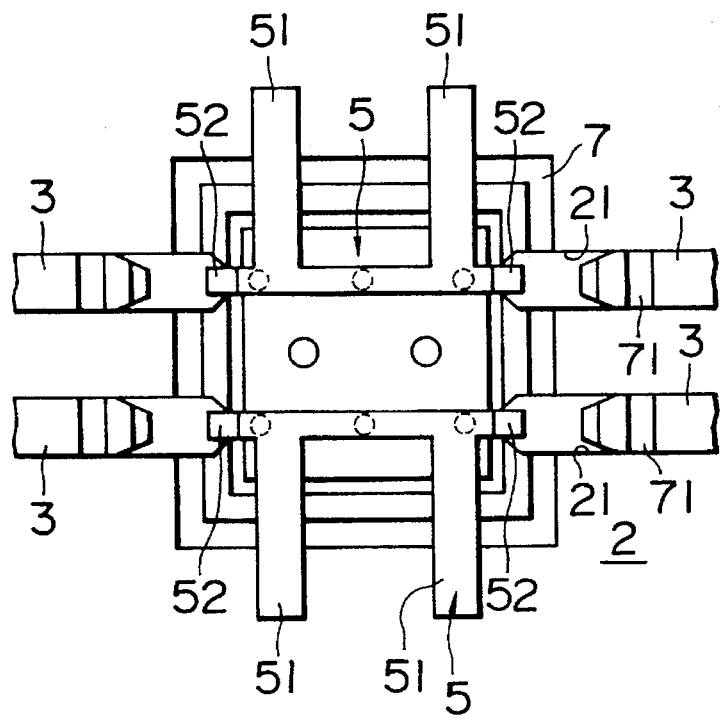
FIG. 2 is a top plan view as seen from the line II—II of FIG. 1.
Figure 6:
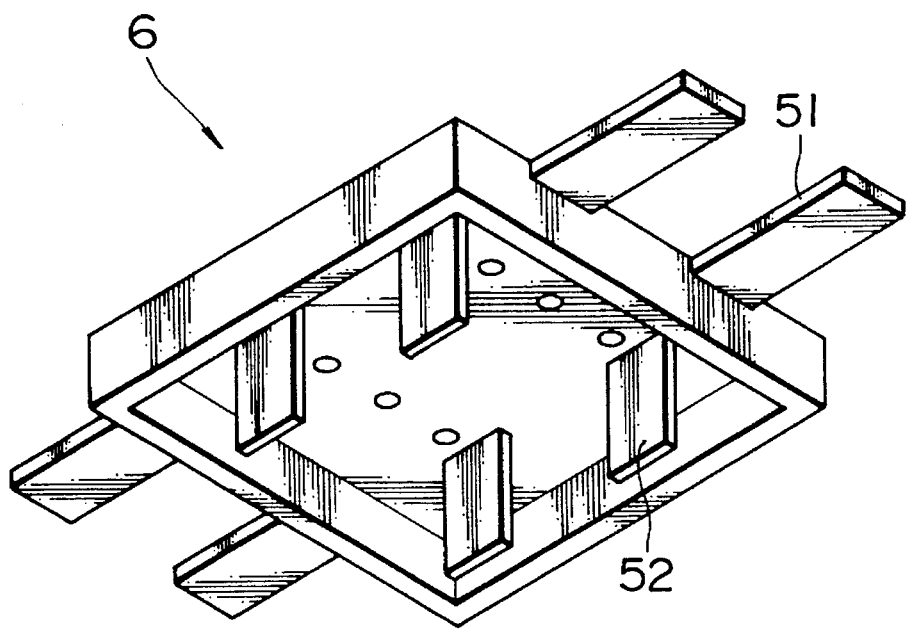
FIG. 6 is a perspective view of the product.

As shown in FIGS. 1 and 2, a mold according to a preferred embodiment of the present invention includes a pair of mold halves 1 and 2, four slide cores 3, and a core 4. For the sake of description, the mold half 1 and the mold half 2 will hereinafter be referred to as "upper mold" and "lower mold", respectively. This mold is suited for molding a box-shaped product 6 (see FIGS. 6 to 8) which has inserts 5, and is open at one side face thereof (bottom face in this embodiment). The term "box-shape" means not only a box of a rectangular cross-section as illustrated, but also those having a circular cross-section, a polygonal cross-section and so on.

The slide cores 3 are slidable relative to the lower mold 2, and cooperate with it to form a lower mold structure. Each of the slide cores 3 has a partial cavity 71 which is to be aligned with a cavity 7 formed in the lower mold 2.

The core 4 cooperates with the lower mold 2 to form the lower mold structure to define therebetween the cavity 7.

Figure 8:
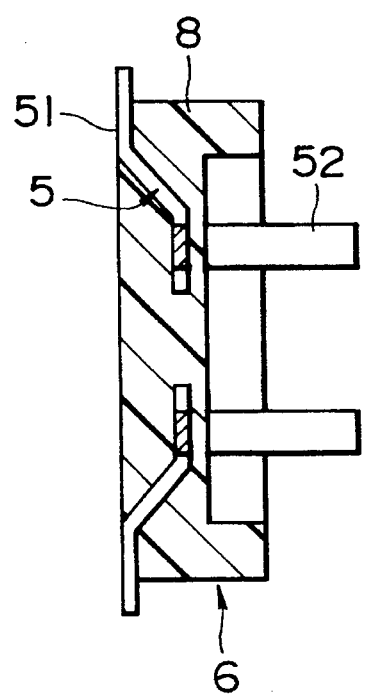
FIG. 8 is a cross-sectional view taken along the line VIII—VIII of FIG. 7.

The insert 5 is an elongate metal plate. The insert 5 includes a body 51 and a leg portion 52 extending perpendicularly from the body 51, as shown in FIG. 2 and 8. In this embodiment, although the adjoining inserts 5 are connected together, they may be separate from each other. Further, the number of the inserts 5 is not limited to four. It may be one or more.

The inserts 5 are placed above the core 4 through spacers, with a gap formed therebetween. Grooves 21 are formed in the portions of the lower mold 2 corresponding respectively to the leg portions 52 of the inserts 5. The leg portions 52 can be received in the grooves 21, respectively. The slide cores 3 are slidably fitted in the grooves 21, respectively. In this embodiment, although four grooves 21 and hence four slide cores 3 are provided, it will readily be appreciated that the number of grooves 21 can be changed depending on the number of the inserts 5 (the leg portions 52).

Figure 7:
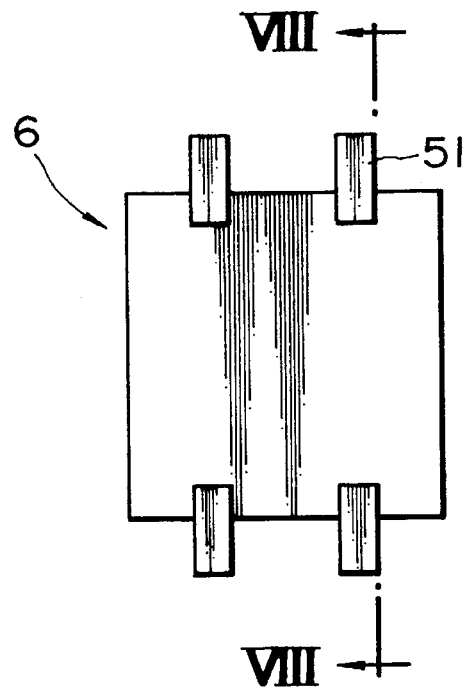
FIG. 7 is a top plan view of the product of FIG. 6.

The body 51 of the insert 5 is stepped as best shown in FIG. 8. The insert 5 is so disposed that a proximal portion of the body 51 thereof is disposed flush with an upper surface of the lower mold 2 while its distal portion adjacent to the leg portion 52 is spaced from the upper surface of the lower mold 2. With this arrangement, the proximal portion of the body 51 of each insert 5, as well as the leg portion 52 thereof, are exposed from the product 6, and the distal portion of the body 51 of each insert 5 is embedded in the product 6, as shown in FIGS. 7 and 8.

A molding operation will now be described.

First, in the condition shown in FIGS. 1 and 2, the upper and lower molds 1 and 2 are clamped together, and the slide cores 3 are slidingly moved inwardly while pressing the leg portions 52 of the inserts 5, respectively. As a result, the cavity 7 is completely defined, and also the leg portions 52 of the inserts 5 are substantially parallel to the portions of the cavity 7 corresponding to the peripheral wall of the product 6.

Figure 3:
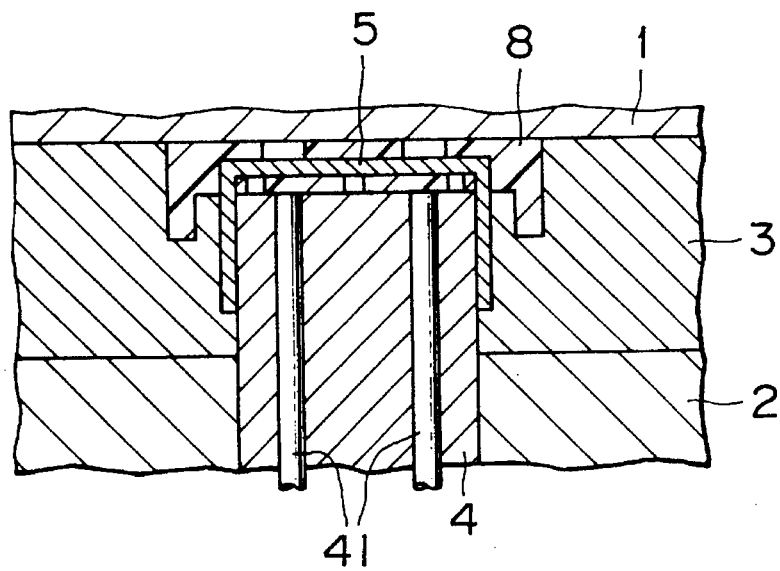
FIG. 3 is a cross-sectional view of the mold in a clamped condition filled with a resin.

Then, a resin 8 is introduced into the whole cavity 7 through a gate 22, as shown in FIG. 3.

Figure 4:
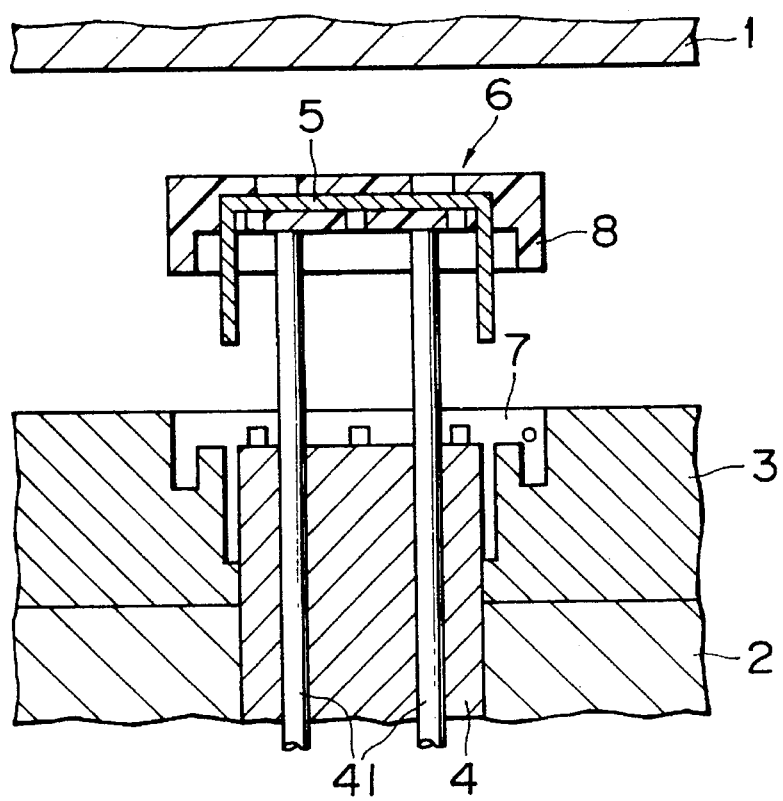
FIG. 4 is a cross-sectional view of the mold unclamped condition with the product ejected by ejection pins.
Figure 5:
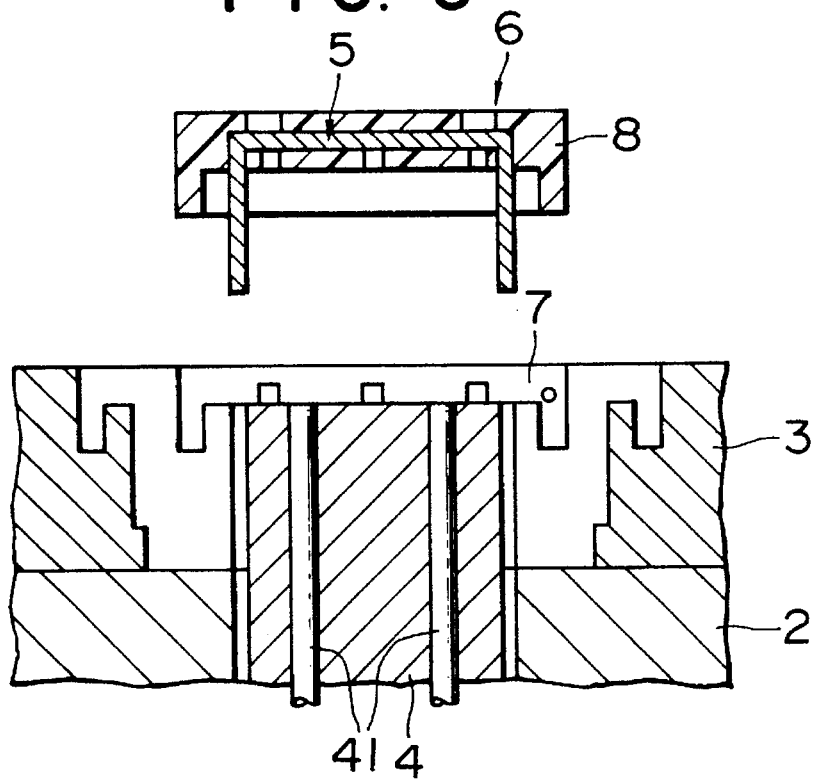
FIG. 5 is a cross-sectional view of the mold in which the slide cores and the ejection pins are retracted for a subsequent molding operation.

After the resin 8 is cured or set, the upper mold 1 is opened. Subsequently, the ejection pins 41 are extended to remove the molded product 6 from the lower mold 2, as shown in FIG. 4.

Thereafter, the slide cores 3 are slidably moved outwardly in preparation for a subsequent molding operation, and the ejection pins 41 are retracted. The above process is repeated to thereby mold the products continuously.

What is claimed is:

1. A method of molding a product having an integral portion formed of a resin and having a flat plate portion and a peripheral wall portion extending perpendicularly from a peripheral edge of said flat plate portion, said product further having at least one insert of metal having a body extending generally parallel to said flat plate portion, and a leg portion projecting from said flat plate portion and substantially parallel to said peripheral wall portion, said method comprising the steps of:

setting said insert on one of a pair of mold halves, which has a partial cavity in a surface thereof such that said body of said insert is generally flush with or adjacent said surface of said one mold half, with said body of said insert adjacent a core;

slidingly moving a slide core in a groove formed in a portion of said one mold half, which corresponds to said leg portion of said insert, said slide core having a cavity portion corresponding to said partial cavity in said one mold half, and pressing said leg portion towards said core;

clamping another of said pair of mold halves to said one mold half and said slide core to define a whole cavity therebetween;

introducing a resin into said whole cavity;

curing or setting said resin; and opening a mold constituted by said pair of mold halves and said slide core, and removing the molded product therefrom.

2. A mold for molding a product having an integral portion formed of a resin and having a flat plate portion and a peripheral wall portion extending perpendicularly from a peripheral edge of said flat plate portion, said product further having at least one insert of metal having a body extending generally parallel to said flat plate-like portion, and a leg portion projecting from said flat plate portion substantially parallel to said peripheral wall portion, said mold comprising:

a pair of mold halves one of which has a partial cavity formed in a surface thereof and a groove formed in a portion thereof corresponding to said leg portion of said insert, said pair of mold halves cooperating with each other to define a cavity;

a core for cooperating with said pair of mold halves and for placing said insert thereon such that said body of said insert is adjacent said core, and that said body of said insert is disposed generally flush with or adjacent from said surface of said one mold half;

at least one slide core received in said groove in said one mold half for sliding movement therealong in directions perpendicular to a direction of opening of said pair of mold halves, said slide core having a cavity portion to be aligned with said partial cavity in said one mold half;

a gate for communicating with said cavity, through which a resin is introduced into said cavity; and an ejection pin for removing the product from the mold.

* * * * *